(12) United States Patent
Russell et al.

(10) Patent No.: US 7,057,594 B1
(45) Date of Patent: Jun. 6, 2006

(54) RECONFIGURABLE LIQUID CRYSTAL DISPLAY

(75) Inventors: Stephen D. Russell, San Diego, CA (US); Randy L. Shimabukuro, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 113 days.

(21) Appl. No.: 10/677,502

(22) Filed: Oct. 1, 2003

Related U.S. Application Data

(63) Continuation-in-part of application No. 08/518,051, filed on Aug. 22, 1995.

(51) Int. Cl.
*G09G 3/34* (2006.01)

(52) U.S. Cl. ........................................ 345/87; 349/123

(58) Field of Classification Search ............ 345/87–89, 345/214, 904; 349/33, 82–87, 123; 347/130; 148/1.5, 175
See application file for complete search history.

(56) References Cited

U.S. PATENT DOCUMENTS

| | | | |
|---|---|---|---|
| 5,589,963 A * | 12/1996 | Gunning et al. | 349/119 |
| 5,745,197 A * | 4/1998 | Leung et al. | 349/77 |
| 5,867,240 A * | 2/1999 | Crawford et al. | 349/118 |
| 5,991,000 A | 11/1999 | Shimabukuro et al. | |
| 6,611,249 B1 * | 8/2003 | Evanicky et al. | 345/102 |
| 6,617,187 B1 | 9/2003 | Shimabukuro et al. | |
| 6,787,201 B1 * | 9/2004 | Hisamitsu et al. | 428/1.3 |

* cited by examiner

*Primary Examiner*—Amare Mengistu
(74) *Attorney, Agent, or Firm*—Peter A. Lipovsky; Michael A. Kagan; Allan Y. Lee

(57) ABSTRACT

A reconfigurable liquid crystal display comprises a polarizer operably coupled to a beam of incident light to pass a beam of polarized light having a polarization axis. A sequence of liquid crystal display pixels serially aligned with the beam of polarized light controls the angle of the polarization axis. An analyzer passes a gray-scale portion of the beam of polarized light from the sequence of liquid crystal display pixels corresponding to the angle of the polarization axis. Each pixel in the sequence may be independently programmed, i.e. reconfigured, to vary the angle of the polarization axis for calibrating the display to a standard gray-scale and for correcting faulty pixels with VLSI on-chip driver and interface circuits.

13 Claims, 10 Drawing Sheets

RECONFIGURABLE LIQUID CRYSTAL DISPLAY

CROSS REFERENCES TO RELATED APPLICATIONS

This application is a continuation-in-part of U.S. patent application Ser. No. 08/518,051, entitled PROGRAMMABLE GRAY-SCALE LIQUID CRYSTAL DISPLAY, filed on Aug. 22, 1995, and which is herein incorporated by reference.

BACKGROUND OF THE INVENTION

The present invention relates to liquid crystal displays formed on silicon-on-sapphire. More specifically, but without limitation thereto, the present invention relates to a liquid crystal display monolithically integrated with electronic circuitry on the display to electrically reconfigure the optical performance such as by providing a programmable gray-scale and to compensate for non-uniform and non-operating pixels in the display.

Liquid crystal displays (LCDs) are used in a wide variety of commercial applications, including portable and laptop computers, wristwatches, camcorders, and television screens. Inherent limitations of existing technology arise from the necessity of fabricating LCDs on transparent glass or quartz substrates, which are not amenable to processing with high quality electronic materials.

The integration of drive circuitry with LCDs has improved reliability and reduced size and weight for portable applications, but has been limited to thin film transistor technology using, for example, amorphous ($\alpha$-Si) and polycrystalline (poly-Si) silicon deposited on glass and quartz substrates.

Lattice and thermal mismatch between layers and low temperature deposition methods used in thin film transistor technology result in a silicon layer with poor charge carrier mobility and crystallographic defects which are directly related to electronic device performance and limitations. A comparison of MOS technologies for active matrix LCDs is shown in the following table:

A need also exists for multiple level gray-scale and color displays for the applications mentioned above. Color displays have been made with colored filters by incorporating dyes into a guest host matrix, or by using field sequential color techniques. Color liquid crystal displays may also be made using the gray-scale properties of a liquid crystal display to achieve variations in color.

While the optical, electrical, and electro-optical properties of the liquid crystal material primarily determine the gray-scale properties, the substrate plays a significant role in the pixel uniformity of the display. Substrate warpage, or variations in surface morphology, can lead to variations in thickness of the liquid crystal layer. This in turn may lead to a non-uniform display intensity for a given pixel voltage, which is a problem for multiple gray-scale displays, high-density displays, and displays having stringent operating requirements. Furthermore, for high brightness displays, substantial heating may occur which cannot be readily dissipated through substrates such as glass or quartz.

Prior research on brightness non-uniformity of LCDs established another cause of display non-uniformity, specifically the high resistance of narrow electrodes in high density LCDs.

A related problem particularly important for displays having stringent specifications is fault tolerance, or recovering from failed pixels. This problem is not emphasized in an LCD market primarily interested in low cost commercial applications, but becomes significant in high-reliability technology.

Another problem is that as display resolutions increase, the number of switching elements required in active matrix displays increases. A higher number of switching elements cause yield problems in manufacturing and in reliability. Fabrication yields of nonlinear switching elements (thin film transistors or diodes) may be improved by redundancy, but the redundancy applies only to the switching element rather than for the entire pixel.

SUMMARY OF THE INVENTION

The reconfigurable LCD is directed to overcoming the problems described above. The following description of a

|  | POLY-TFT HT-CMOS | POLY-TFT MT-CMOS | $\alpha$-Si:H NMOS | CMOS UTSOS |
| --- | --- | --- | --- | --- |
| 1. Substrate | fused quartz | hard glass | hard glass | $Al_2O_3$ |
| 2. Max process temp | ~1000° C. | 600° C. | 300° C. | 1000° C. |
| 3. Threshold (Volts)(n-chnl) | 2.0 | 2.0 | 1.5 | 0.5 |
| 4. Mobility | 100 | 40 | 0.75 | 380 |
| 5. Shift register | 20 MHz @ 15 V | 5 MHz @ 15 V | 0.1 MHz @ 15 V | >100 MHz @ 5 V |
| 6. Integrated LSI logic | N/A | N/A | N/A | yes |

For ultra-high resolution display applications, the high density of LSI circuitry is of particular importance for integrated displays. Compatibility with Very Large Scale Integration (VLSI) allows integration on-chip of video drivers, digital logic, compensating or fault-tolerant circuitry, and other computational circuitry, thereby providing greater functionality, higher reliability, and improved performance. Thus, a need exists for a material quality that overcomes the problems, which occur in small scale, high-density circuitry fabricated in $\alpha$-Si and poly-Si.

reconfigurable LCD does not preclude other embodiments that may exist or become obvious to those skilled in the art.

The reconfigurable LCD comprises a polarizer operably coupled to a beam of incident light to pass a beam of polarized light having a polarization axis. A sequence of liquid crystal display pixels serially aligned with the beam of polarized light controls the angle of the polarization axis. An analyzer passes a gray-scale portion of the beam of polarized light from the sequence of liquid crystal display pixels corresponding to the angle of the polarization axis. Each pixel in the sequence may be independently programmed or reconfigured to vary the angle of the polarization axis for calibrating the display to a standard gray-scale and for correcting faulty pixels with VLSI on-chip driver and interface circuits.

The features summarized above in addition to other aspects of the reconfigurable LCD will become more apparent from the description, presented in conjunction with the following drawings.

BRIEF DESCRIPTION OF THE DRAWINGS

For a more complete understanding of the reconfigurable LCD, reference is now made to the following detailed description of the embodiments as illustrated in the accompanying drawings wherein.

DESCRIPTION OF THE PREFERRED EMBODIMENT

Figure 1:
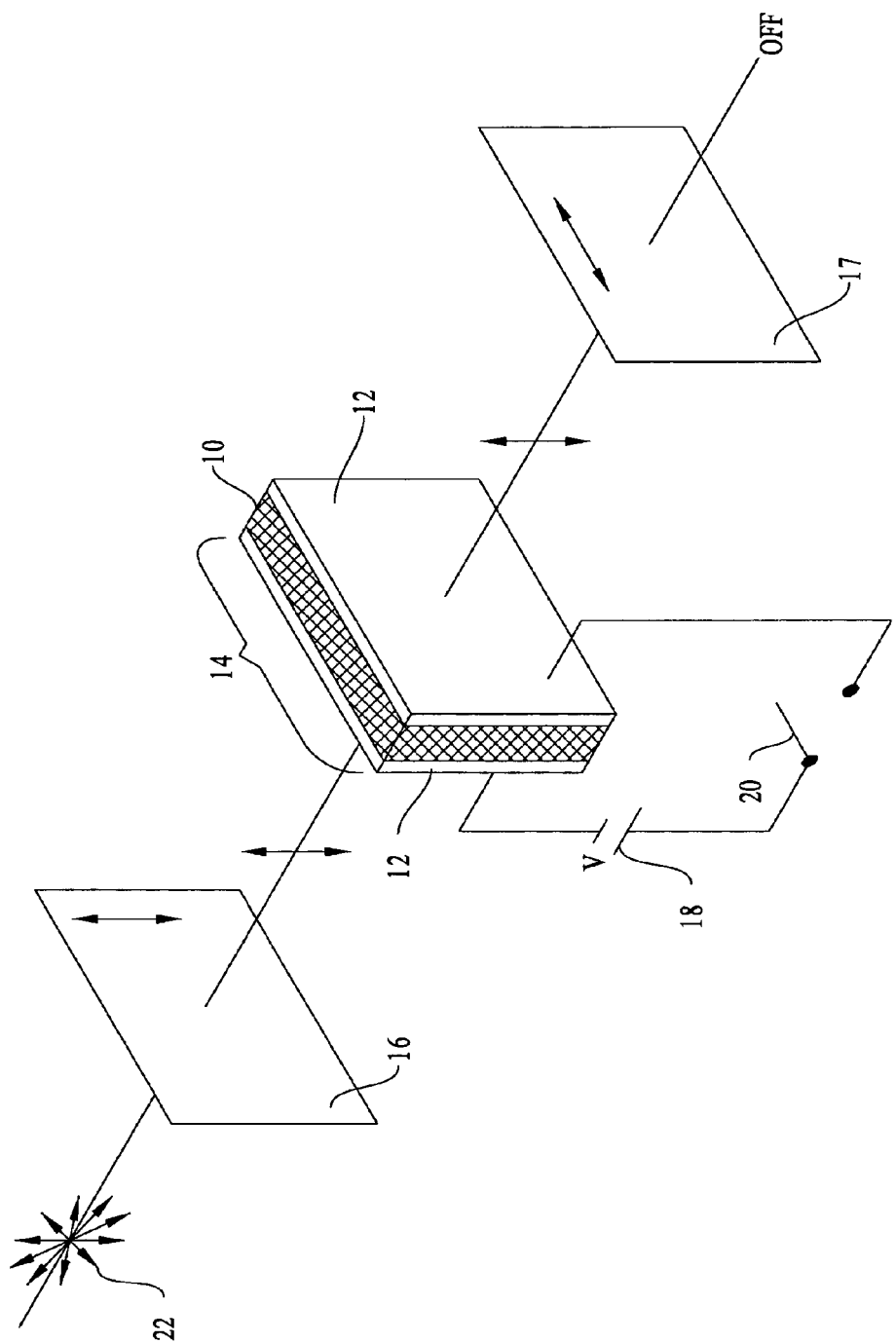
FIG. 1 is a diagram of an example in the prior art of a liquid crystal display pixel in the non-transmissive or OFF state.
Figure 2:
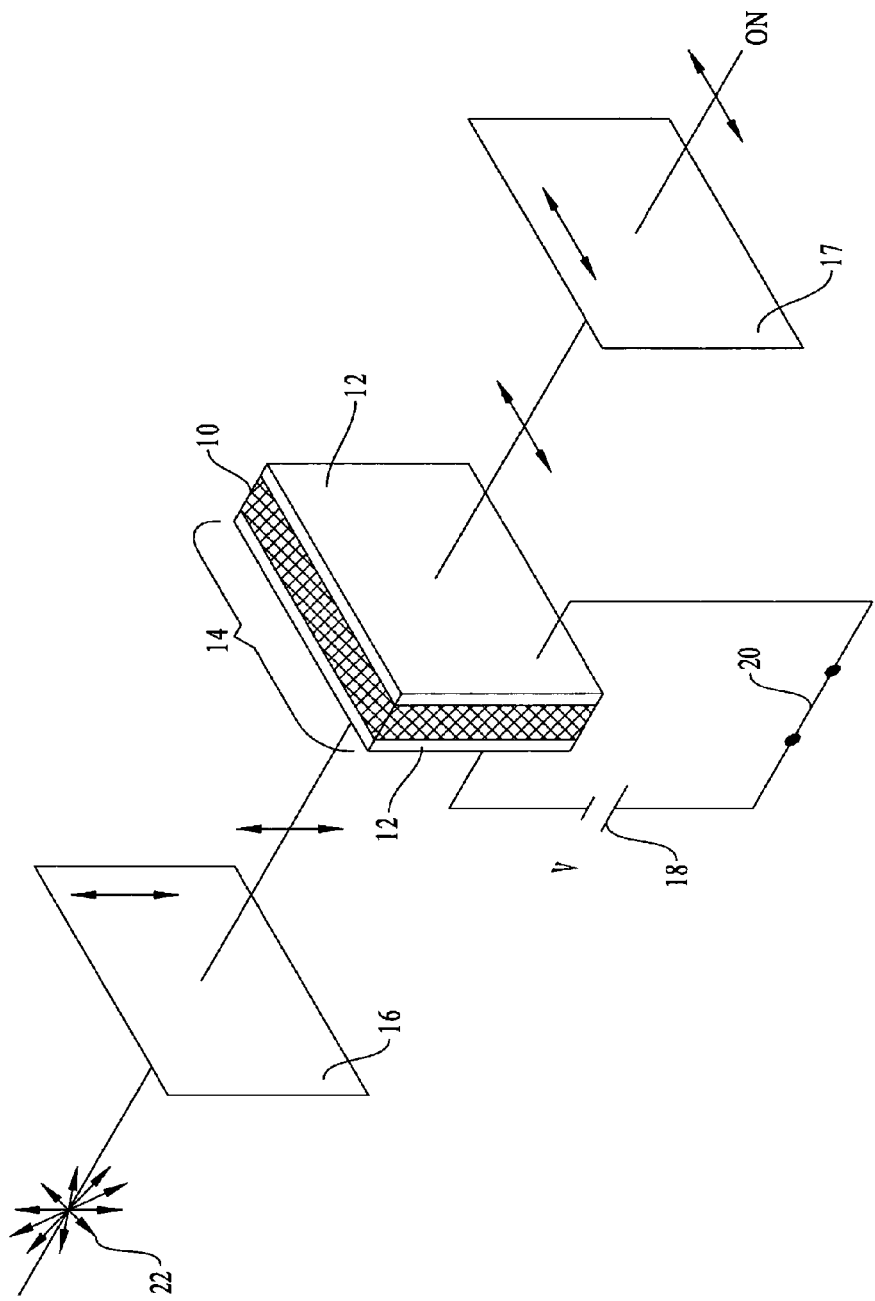
FIG. 2 is a diagram of the liquid crystal display pixel of FIG. 1 in the transmissive or ON state.
Figure 3:
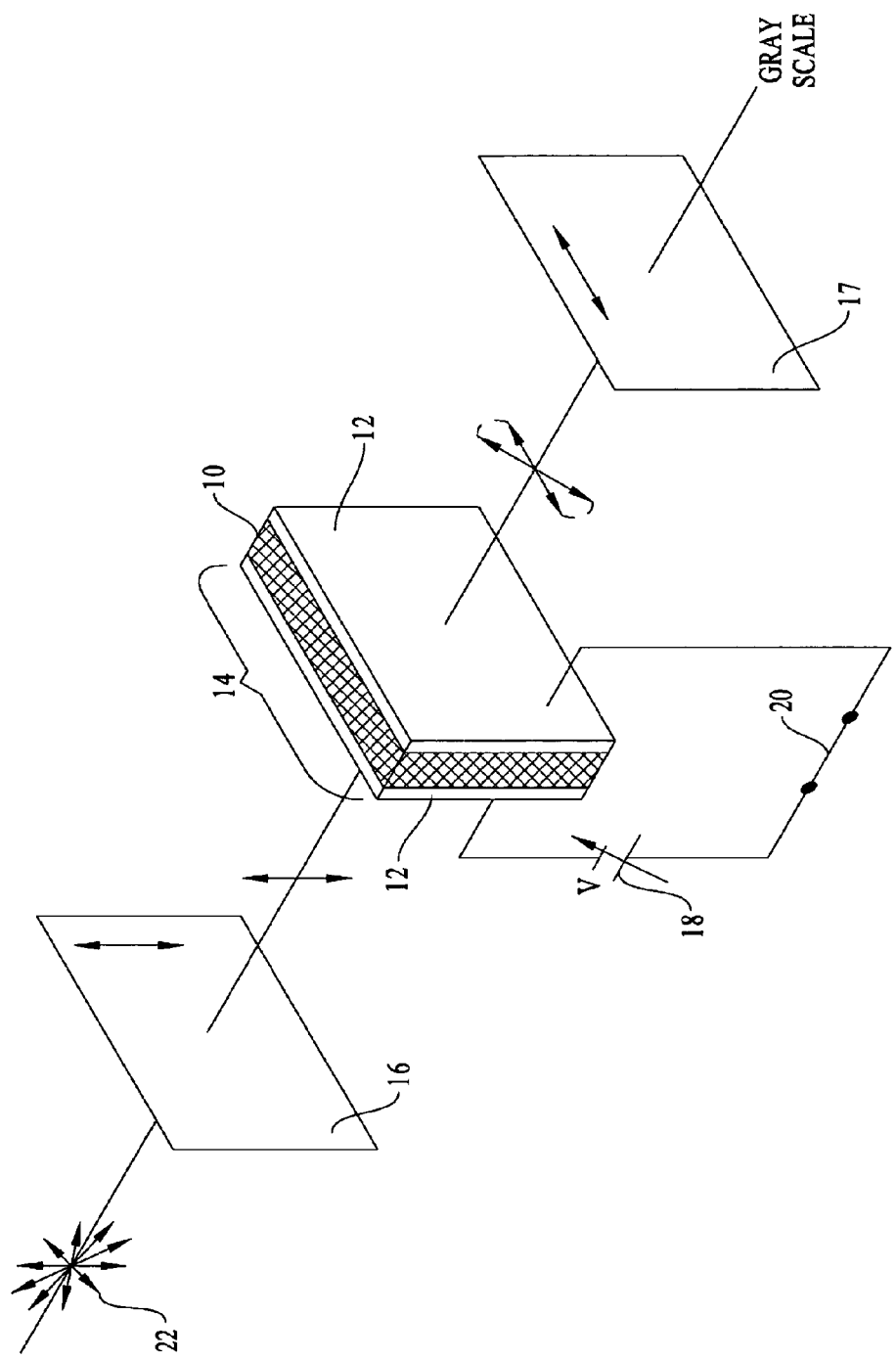
FIG. 3 is a diagram of the liquid crystal display pixel of FIG. 1 with gray-scale control.

FIGS. 1–3 are diagrams illustrating an example of liquid crystal display (LCD) gray-scale as currently practiced. In FIG. 1, a liquid crystal medium 10 is contained within transparent electrodes 12 to form a pixel element 14. Pixel element 14 is then placed between a polarizer 16 and an analyzer 17. Analyzer 17 polarizes light in a direction orthogonally oriented with polarizer 16. When unpolarized light from a light source 22 passes through polarizer 16, transparent electrodes 12, and liquid crystal medium 10, the light becomes polarized and is absorbed by analyzer 17. Pixel element 14 consequently appears OFF or opaque.

In FIG. 2, closing a switch 20 causes the application of a voltage V from a voltage source 18 to transparent electrodes 12. Voltage V causes the orientation of liquid crystal medium 10 to change, which rotates the polarization axis of the light from light source 22 passing through polarizer 16. The rotated polarization axis allows the light to pass through analyzer 17. Pixel element 14 consequently appears ON or transparent.

In FIG. 3, voltage V is varied to vary the rotation of the polarization axis of the light from light source 22. The percentage of light from light source 22 passing through analyzer 17 may thus be controlled, resulting in a gray-scale varying from transparent to opaque. Typical LCDs are fabricated from a plurality of pixel elements 14, usually in a two-dimensional array or display area. A variation of this concept includes the design of pixel elements in a liquid crystal medium that are in the OFF state or opaque when there is no voltage applied to the transparent electrodes. Another variation uses bistable ferroelectric liquid crystals (FLCs), which have a continuously variable polarization with application of a voltage. FLCs may exhibit a gray scale by rapidly switching the pixels to allow a time averaged optical state, which corresponds to a gray level. When used for color generation, the FLC pixel switching is correlated with the desired wavelength of light. This method is referred to as field sequential color.

The embodiment described herein pertains to nematic liquid crystals, however FLCs, supertwisted nematic, and the like may also be used to practice the present invention.

Figure 4A:
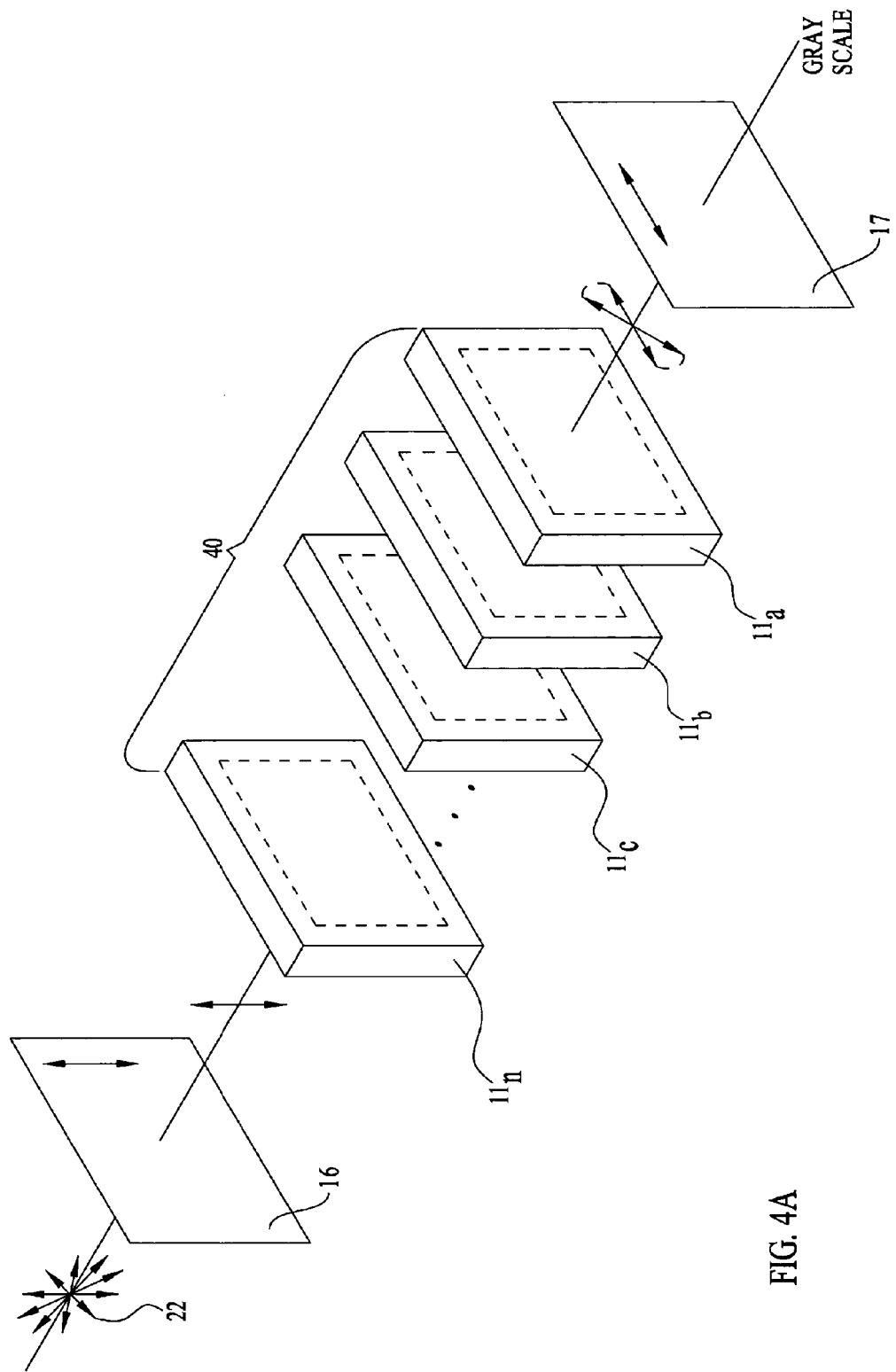
FIG. 4A illustrates the reconfigurable LCD in the typical configuration of FIG. 3 including a polarizer and an analyzer.

In FIG. 4A, reconfigurable LCD 40 of the present invention is shown in the typical configuration of FIG. 3 with polarizer 16 and analyzer 17. Reconfigurable LCD 40 comprises: a polarizer 16 for coupling to a beam of incident light to polarize the beam of light with respect to a polarization angle; a plurality of liquid crystal display regions $11_a$, $11_b$, $11_c$, . . . , $11_n$ operably coupled to the polarizer 16, wherein a plurality of pixels (not shown) are arrayed on each of the display regions $11_a$, $11_b$, $11_c$, . . . , $11_n$ and the display regions $11_a$, $11_b$, $11_c$, . . . , $11_n$ are superimposed upon each other to create a one-to-one correspondence between pixels on the superimposed display regions $11_a$, $11_b$, $11_c$, . . . , $11_n$; an analyzer 17 coupled to the plurality of liquid crystal display regions $11_a$, $11_b$, $11_c$, . . . , $11_n$ and the polarizer 16 to pass a gray-scale portion of the beam of polarized light transmitted as a function of the polarization angle; and a means monolithically formed adjacent to at least one of said liquid crystal display regions $11_a$, $11_b$, $11_c$, . . . , $11_n$ In to reconfigure at least one of said liquid crystal display regions $11_a$, $11_b$, $11_c$, . . . , $11_n$.

Figure 4B:
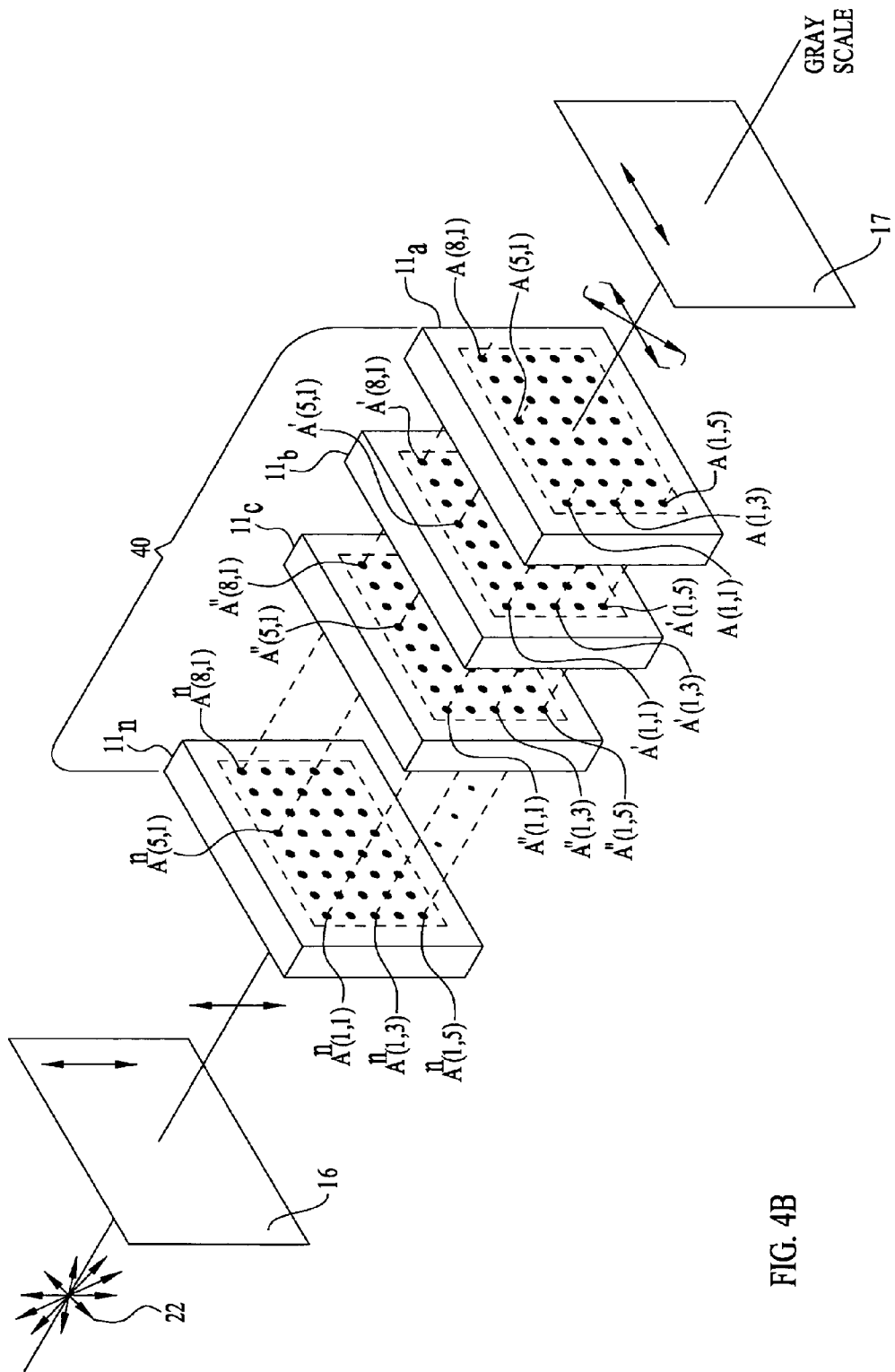
FIG. 4B illustrates the one-to-one correspondence across a plurality of liquid crystal display regions thereby defining a pixel sequence.

Referring now to FIG. 4B, the plurality of liquid crystal display regions $11_a$, $11_b$, . . . , $11_n$ of reconfigurable LCD 40 is shown. On each of the display regions $11_a$, $11_b$, . . . , $11_n$ a plurality of pixels are arranged into rows and columns. Display region $11_a$ comprises pixels $A_{(1,1)}$, $A_{(1,3)}$, . . . , $A_{(1,y)}$, . . . , $A_{(5,1)}$, $A_{(5,2)}$, . . . , $A_{(5,y)}$, . . . $A_{(x,y)}$. Display region $11_b$ comprises pixels $A"_{(1,1)}$, $A"_{(1,3)}$, . . . , $A"_{(1,y)}$, . . . , $A"_{(5,1)}$, $A"_{(5,2)}$, . . . , $A"_{(5,y)}$, . . . $A"_{(x,y)}$. Display region $11_c$ comprises pixels $A"_{(1,1)}$, $A"_{(1,3)}$, . . . , $A"_{(1,y)}$, . . . , $A"_{(5,1)}$, $A"_{(5,2)}$, . . . , $A"_{(5,y)}$, . . . $A"_{(x,y)}$. Display region $11_n$ comprises pixels $A^n_{(1,1)}$, $A^n_{(1,3)}$, . . . , $A^n_{(1,y)}$, . . . , $A^n_{(5,1)}$, $A^n_{(5,2)}$, . . . , $A^n_{(5,y)}$, . . . $A^n_{(x,y)}$. As shown in FIG. 4B, display regions $11_a$, $11_b$, $11_c$, . . . , $11_n$ are superimposed upon each other so that a one-to-one correspondence between pixels, thus creating pixel sequences. For example, one-to-one correspondence exists between pixel sequence $A_{(1,1)}$-$A'_{(1,1)}$-$A"_{(1,1)}$- · · · -$A^n_{(1,1)}$. There is also one-to-one correspondence between pixel sequence $A_{(1,3)}$-$A'_{(1,3)}$-$A"_{(1,3)}$- · · · -$A^n_{(1,3)}$, between pixel sequence $A_{(1,5)}$-$A'_{(1,5)}$-$A"_{(1,5)}$- · · · -$A^n_{(1,5)}$, between pixel sequence $A_{(8,1)}$-$A'_{(8,1)}$-$A"_{(8,1)}$-$A^n_{(8,1)}$, and so on.

Figure 4C:
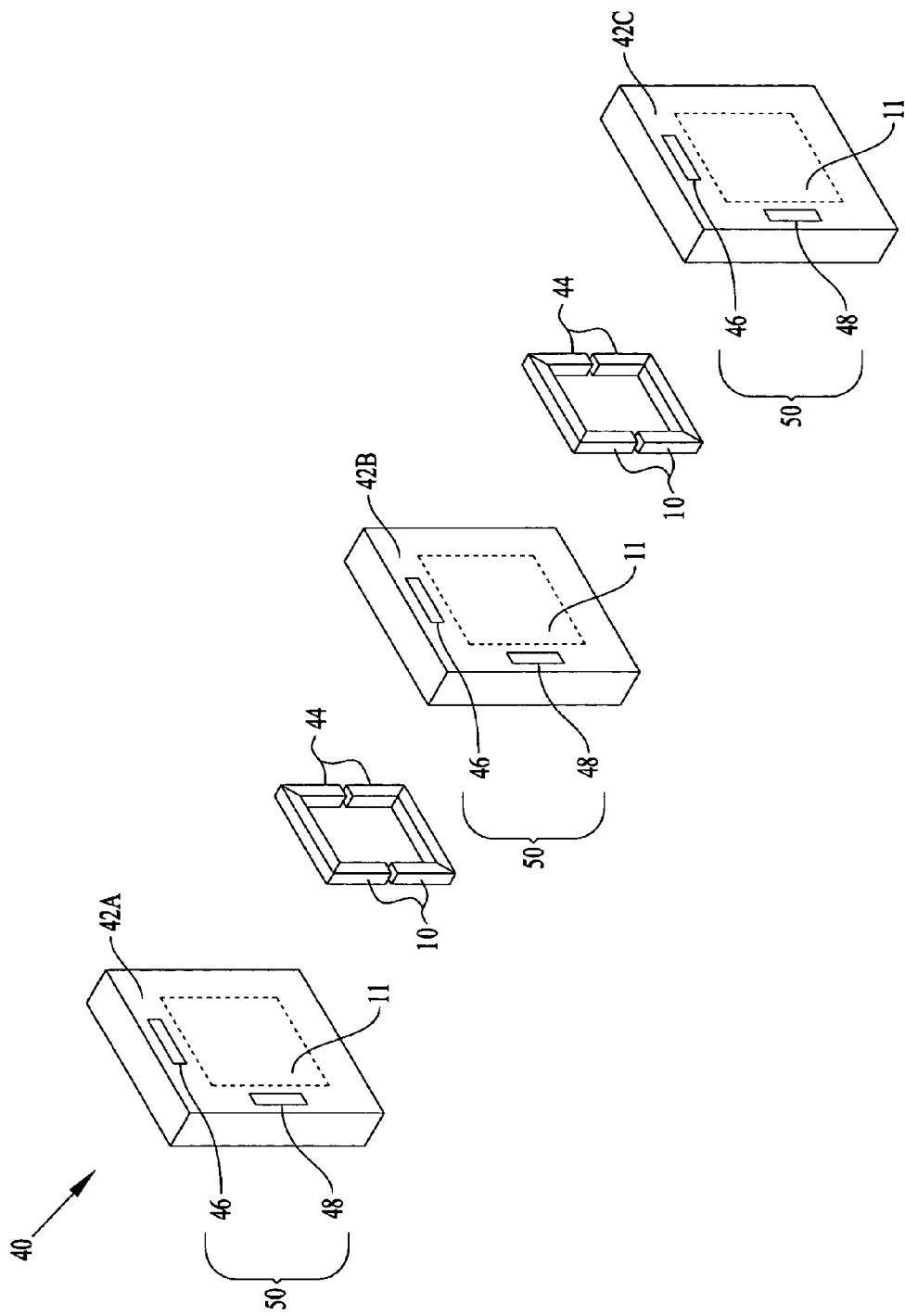
FIG. 4C is an exploded view diagram of the reconfigurable LCD of FIG. 4A.

FIG. 4C is a diagram of a reconfigurable LCD 40 of the present invention with silicon-on-sapphire (SOS) technology to provide the advantage of VLSI compatibility. In this exploded view, spacers 44 form a cavity between SOS wafers 42. Pixel element electrodes are formed in SOS wafers 42A, 42B, and 42C. SOS wafers 42A, 42B, and 42C are referred to collectively as SOS wafers 42. The cavity formed by SOS wafers 42 and spacers 44 are filled with an appropriate liquid crystal material 10, such as nematic, supertwisted nematic or ferroelectric liquid crystals, and interposed between SOS wafers 42. Exemplary techniques for fabricating spacers are described by R. L. Shimabukuro et al. in U.S. Pat. No. 5,991,000 entitled "Cavity Uniformity Having Patterned Spaces of Aluminum Oxide or Silicon Dioxide". Exemplary techniques for fabricating SOS wafers 42 are described by R. L. Shimabukuro et al. in U.S. Pat. No. 6,617,187 entitled "Method For Fabricating An Electrically Addressable Silicon-On-Sapphire Light Valve" incorporated herein by reference thereto. SOS wafers 42 provide drive control and pixel electrodes for liquid crystal material 10. Each of SOS wafers 42 may be fabricated independently and joined in the final steps of fabrication. The combination of spacers 44 and SOS wafers 42 results in a serial arrangement of pixels in optically coupled independent displays. In this arrangement, pixels on adjacent independent display panels are collinear with a straight line passing through the optical axis of reconfigurable LCD 40, so that a beam of polarized light passes through a sequence of serially aligned pixels. The pixels may be individually programmed, or reconfigured, to calibrate a uniform gray-scale and to provide redundancy for replacing faulty pixels. Interface circuitry 46 and electronically programmable driver circuitry 48 may be formed monolithically on SOS wafers 42 according to well-known techniques to provide gray-scale control 50.

Figure 5:
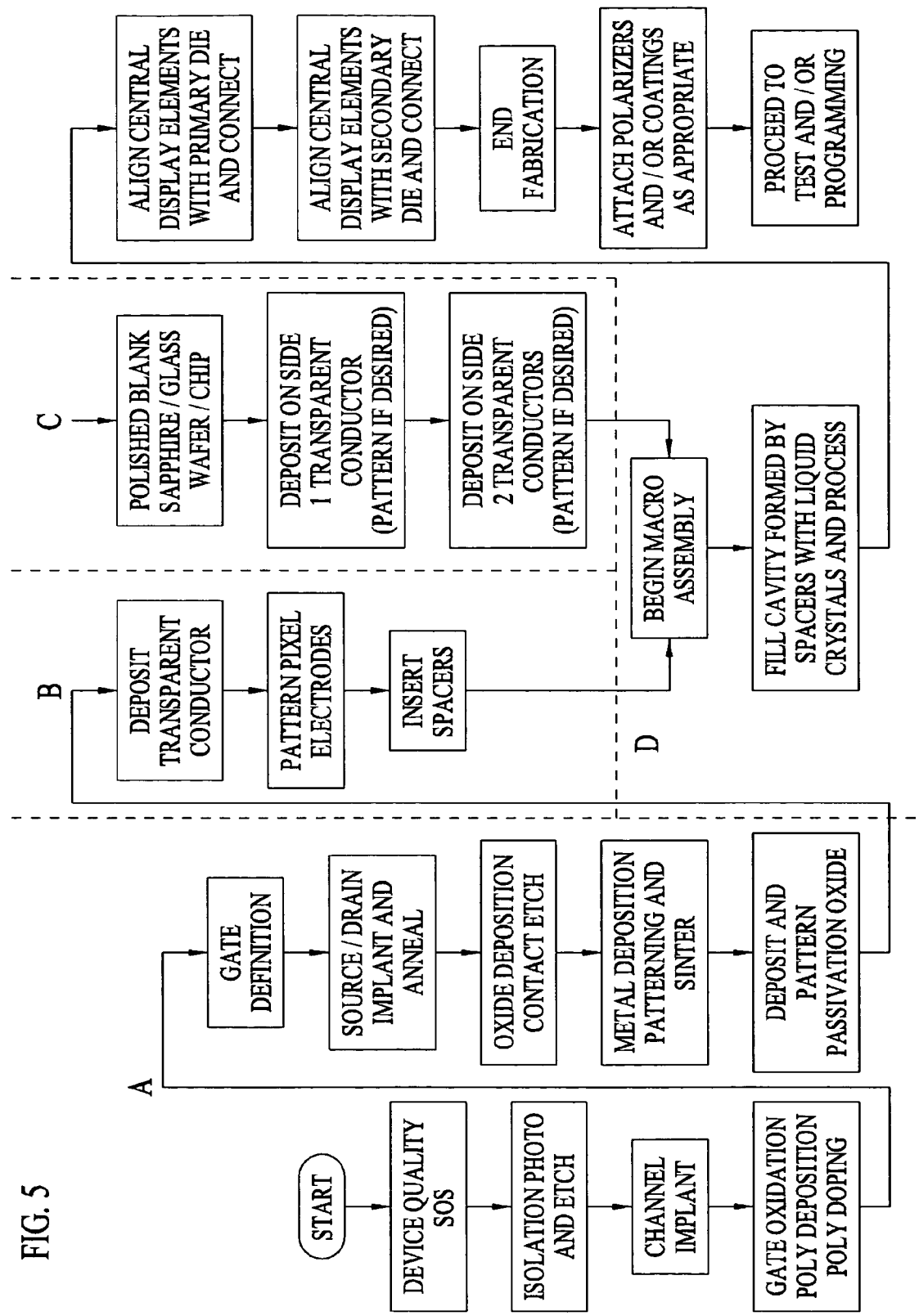
FIG. 5 is a flow chart of the method for fabricating the reconfigurable LCD.

FIG. 5 is a flow chart of the process for fabricating reconfigurable LCD 40. Portion "A" lists the order of steps in the fabrication of SOS wafers 42 comprising the monolithically integrated drive control and pixel electrode circuitry. The drive control electronics may include circuitry to detect failure conditions in the display, to calibrate the display gray-scale, or to switch to alternative pixel configurations for replacing defective pixels. The circuitry need not be identical on each of SOS wafers 42, but preferably includes common drive and interface circuitry indicated in FIG. 4C as 46 and 48 respectively. Portion "B" of FIG. 6 describes the fabrication of the pixel electrodes on SOS wafers 42A and 42C and insertion of spacers 44. Portion "C" of FIG. 5 lists the order of steps for fabricating the pixel electrodes on SOS wafer 42B. Portion "D" of FIG. 5 lists the order of steps for joining SOS wafers 42 and spacers 44 to form reconfigurable LCD 40.

Referring now to FIGS. 4C and 5, SOS wafers 42A and 42C in FIG. 4C are formed of device quality silicon-on-sapphire. Well-known techniques are used to form VLSI circuitry (not shown) in the steps of isolation photo and etch, channel implant, gate oxidation, poly deposition and doping, gate definition, source/drain implant and annealing, oxide deposition and contact etch, metal deposition, patterning, and sintering, and deposition and patterning of passivation oxide. The VLSI circuitry may be formed on SOS wafers 42 outside of a display region 11.

A transparent conductor such as indium tin oxide, tin oxide, or polysilicon is deposited on substrates 42A and 42C in display region 11 and pixel electrodes (not shown) are patterned according to well-known techniques. Spacers 44, schematically shown in FIG. 4C, are then attached to substrates 42B and 42C. Spacers 44 may be, for example, glass beads randomly distributed on the substrate.

A transparent conductor is deposited on opposite sides of a polished blank sapphire wafer or alternately glass, quartz or other transparent material to form SOS wafer 42B. The transparent conductor may then be patterned and formed into pixel electrodes (not shown).

Spacers 44 are inserted to form cavities on SOS wafers 42. The cavities are then filled with liquid crystal material 10. The pixel elements on each of display regions 11 of SOS wafers 44 are serially aligned to form pixel sequences, and SOS wafers 42 and spacers 44 are assembled into a single structure. The assembly of LCD 40 is completed with the addition of polarizer 16 and analyzer 17 of FIG. 4A using techniques well known to those skilled in the art.

Figure 6:
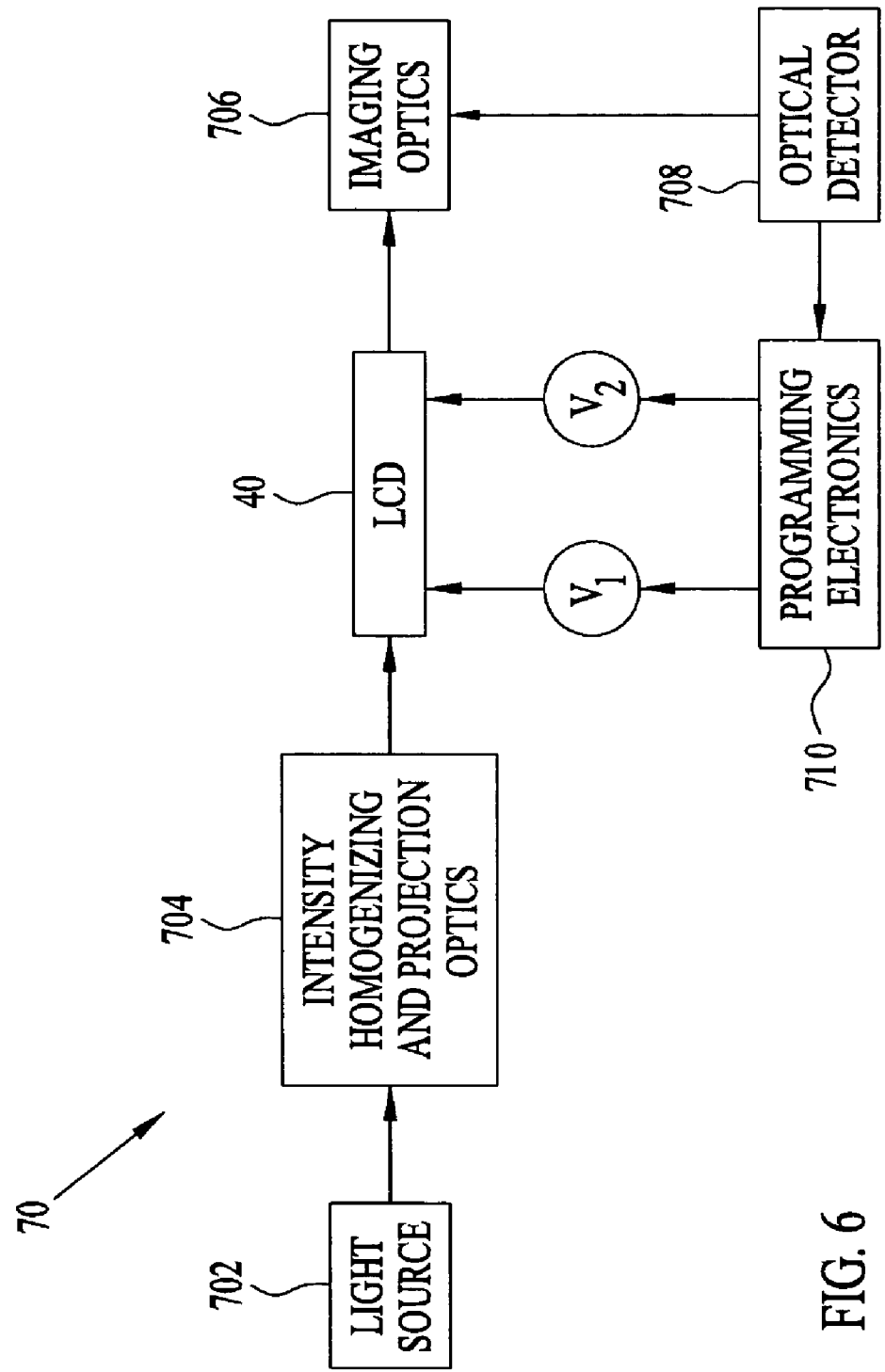
FIG. 6 is a block diagram of an optical test bed used for programming the reconfigurable LCD.

Reconfigurable LCD 40 may be programmed and calibrated in an optical test bed 70 as shown in the block diagram of FIG. 6. A light source 702 transmits a beam of light having a spatially uniform intensity pattern through intensity homogenizing and projection optics 704 to reconfigurable LCD 40. The light passed by reconfigurable LCD 40 is focused by imaging optics 706 and measured by an optical detector 708. Programming electronics 710 adjusts programming voltages $V_1$ and $V_2$ to vary the gray-scale to a desired value as measured by optical detector 708 for each pixel sequence of LCD 40.

Figure 7:
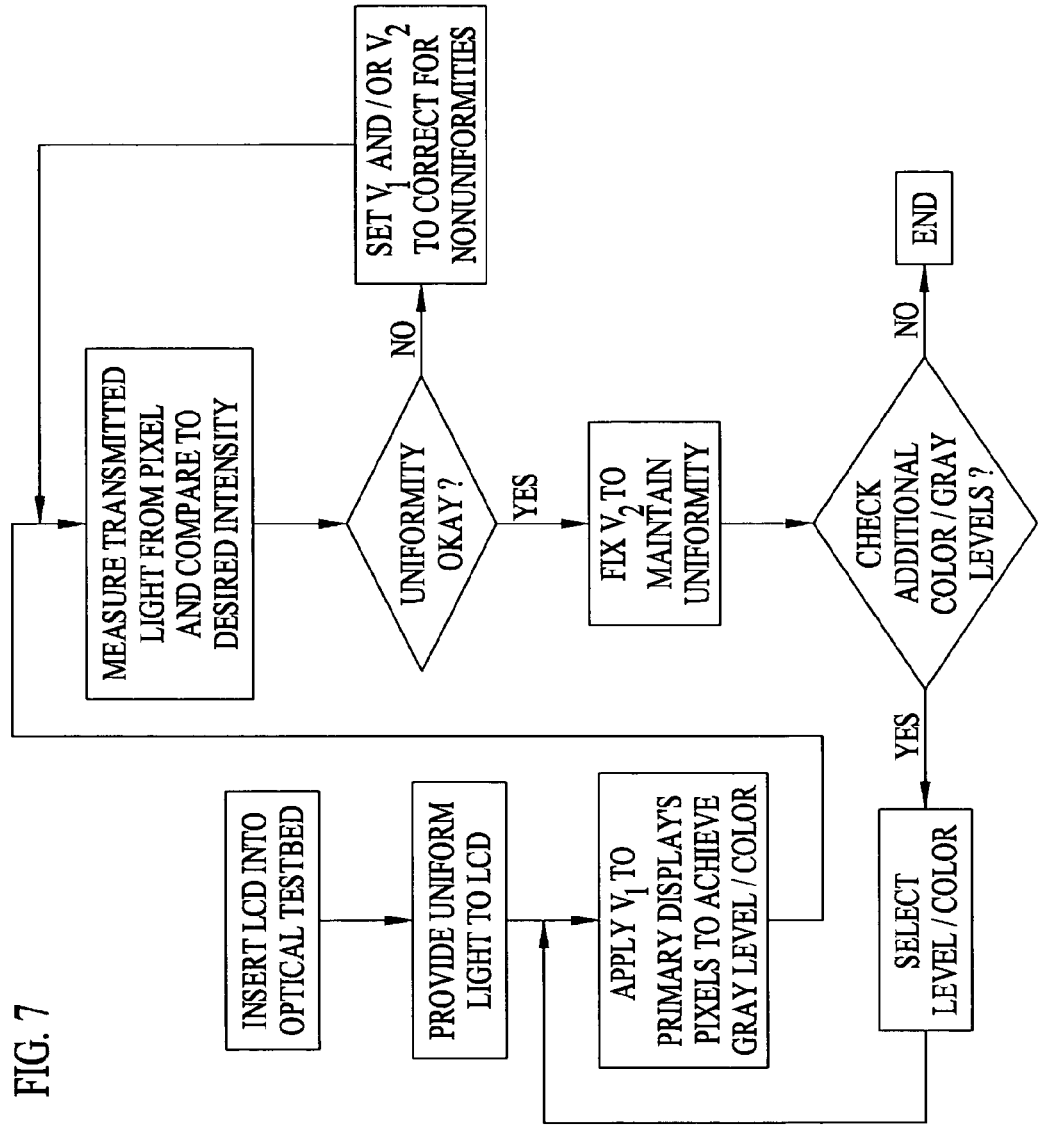
FIG. 7 is a flow chart of gray-scale calibration programming of the reconfigurable LCD of FIG. 4A in the test bed of FIG. 6.

FIG. 7 is a flow chart of a method for calibrating reconfigurable LCD 40 to a standard gray-scale. Reconfigurable LCD 40 is placed into optical test bed 70 of FIG. 6 and subjected to light from light source 702. Voltage $V_1$ is applied to a pixel of one of the independent displays of reconfigurable LCD 40 corresponding to a gray-scale or color value. The percentage of light passed through the selected pixel is measured by optical detector 708 and compared to a standard. If the measured value is within tolerance of the standard value, voltage $V_2$ is fixed to maintain the calibrated pixel intensity and voltage $V_1$ is applied to another pixel sequence. If the measured value lies outside the tolerance of the standard value, $V_2$ and/or $V_1$ may be adjusted to vary the percentage of light passed to optical detector 708 until the measured value is within tolerance. Each row and column of reconfigurable LCD 40 may be calibrated in a similar manner. After reconfigurable LCD 40 has been calibrated for one gray-scale level or color, another level or color is selected and the calibration is repeated until all rows and columns of LCD 40 are calibrated for all gray-scale levels or colors of the standard.

Figure 8:
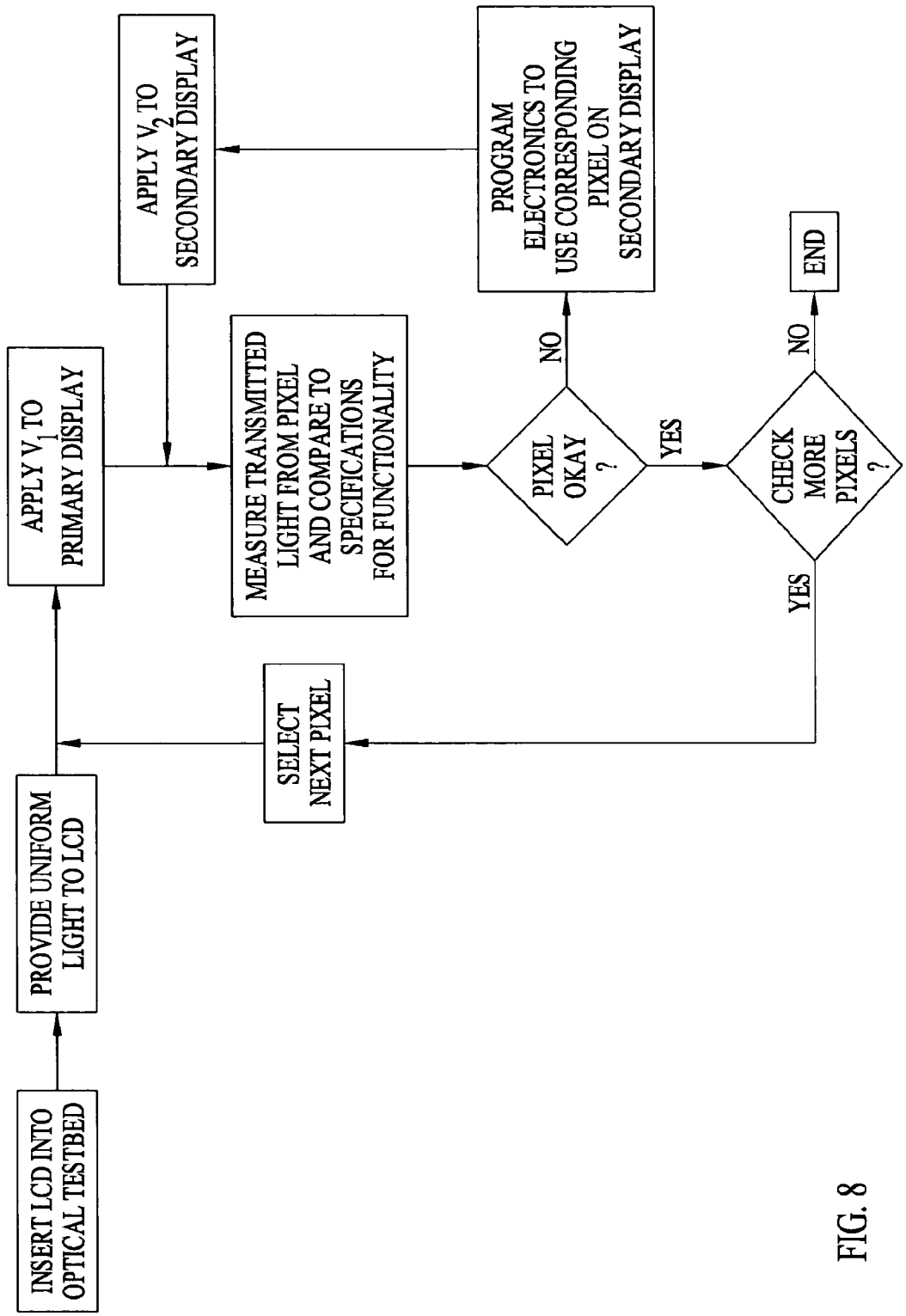
FIG. 8 is a flow chart of fault tolerance programming of the reconfigurable LCD in the test bed of FIG. 6.

FIG. 8 is a flow chart of a method for correcting faulty pixels. Reconfigurable LCD 40 is placed into optical test bed 70 of FIG. 6 and subjected to light from light source 702. While Voltage $V_1$ is applied to a pixel in a pixel sequence of reconfigurable LCD 40, the light passing through the pixel is measured and compared with a standard value. If the measurement falls outside the specification tolerance, voltage $V_2$ is applied to another pixel in the pixel sequence. Voltage $V_2$ is then adjusted in increments until the measured light passing through the pixels falls within the specified tolerance. Once the desired value is achieved, $V_2$ is fixed for the corresponding pixel. Each pixel in the display area may be similarly calibrated.

Monolithically integrated, i.e. on-chip, VLSI circuitry is fabricated according to well-known techniques outside region 11 of SOS wafers 42 in FIG. 4C. The VLSI circuitry may include memory circuits such as static random access memory (SRAM), dynamic RAM (DRAM), and non-volatile RAM (NVRAM) to store the calibration information obtain through the processes described in FIG. 7 and FIG. 8.

Clearly, many modifications and variations of the reconfigurable LCD are possible in light of the above teachings. It is therefore to be understood that within the scope of the appended claims, the reconfigurable LCD may be practiced otherwise than as specifically described.

We claim:

1. A reconfigurable liquid crystal display comprising:
   a polarizer for coupling to a beam of incident light to polarize said beam of light with respect to a polarization angle;
   a plurality of liquid crystal display regions operably coupled to said polarizer, wherein a plurality of pixels are arrayed on each of said display regions and said display regions are superimposed upon each other to create a one-to-one correspondence between pixels on said superimposed display regions;
   an analyzer coupled to said plurality of liquid crystal display regions and said polarizer to pass a gray-scale portion of said beam of polarized light transmitted as a function of said polarization angle; and
   a means to reconfigure at least one of said liquid crystal display regions, wherein said means is monolithically formed adjacent to at least one of said liquid crystal display regions.

2. The reconfigurable liquid crystal display of claim 1, further comprising an array of pixel sequences arranged into rows and columns operably coupled to said polarizer, said beam of polarized light, and said analyzer.

3. The reconfigurable liquid crystal display of claim 2, further comprising a gray-scale control operably coupled to each of said pixels for varying said polarization angle.

4. The reconfigurable liquid crystal display of claim 3, wherein said gray-scale control includes a monolithically fabricated electronically programmable driver and interface circuitry for calibrating said pixel sequence to a gray-scale standard.

5. The reconfigurable liquid crystal display of claim 3, wherein said gray-scale control includes electronically programmable driver and interface circuitry for correcting a failed pixel within said pixel sequence.

6. The reconfigurable liquid crystal display of claim 3, further comprising:
   transparent substrates, wherein said gray-scale control further comprises drive circuitry formed on said substrates;
   transparent pixel electrodes operably coupled to said drive circuitry, wherein said pixel electrodes are formed in a transparent display region on each of said substrates; and
   a liquid crystal material operably coupled to said transparent display regions to form said pixels.

7. The reconfigurable liquid crystal display of claim 1, wherein each of said pixels is formed on a transparent substrate.

8. The reconfigurable liquid crystal display of claim 7, wherein said substrate comprises sapphire.

9. The reconfigurable liquid crystal display of claim 1, wherein said pixels are formed in an active matrix liquid crystal display.

10. The liquid crystal display of claim 1, wherein said pixels comprise a liquid crystal material, wherein said liquid crystal material is one of nematic, supertwisted nematic, or ferroelectric liquid crystals.

11. The liquid crystal display of claim 1 wherein said means to reconfigure at least one of said liquid crystal display regions comprises an electronically programmable driver and interface circuitry monolithically formed on at least one of said liquid crystal display regions.

12. The liquid crystal display of claim 1 wherein said means to reconfigure at least one of said liquid crystal display regions comprises control of the gray-scale intensity of the transmitted light through at least two collinear pixels on at least two liquid crystal display regions.

13. A method of forming a reconfigurable liquid crystal display comprising the steps of:
   providing a polarizer;
   providing a plurality of collinearly arranged liquid crystal display regions, each of said liquid crystal display regions including a plurality of pixels configured in a two-dimensional array in the plane of said liquid crystal display regions;
   orienting each liquid crystal display region so that each pixel in the array has a one-to-one correspondence with a pixel on an adjacent liquid crystal display region;
   providing an analyzer operably coupled to said liquid crystal display regions and said polarizer; and
   providing a means to control gray-scale on said plurality of liquid crystal display regions.

* * * * *